US006168408B1

(12) United States Patent
Boime et al.

(10) Patent No.: US 6,168,408 B1
(45) Date of Patent: Jan. 2, 2001

(54) APPARATUS FOR MANUFACTURING COMPOSITE PARTS PRODUCED BY RESIN TRANSFER MOLDING (75) Inventors: Bernard Boime, Rueil Malmaison; Didier Filleul, Villebon/Yvette, both of (FR)

(73) Assignee: Aerospatiale Societe Nationale Industrielle, Paris (FR)

(*) Notice: Under 35 U.S.C. 154(b), the term of this patent shall be extended for 0 days.

(21) Appl. No.: 09/121,116

(22) Filed: Jul. 23, 1998

(51) Int. Cl.$^7$ .................................................. B29C 45/76
(52) U.S. Cl. ...................... 425/129.1; 425/145; 425/149; 264/40.3; 264/40.7; 264/382.8
(58) Field of Search .................... 264/328.2, 328.4, 264/328.8, 40.3, 40.7; 425/116, 129.1, 145, 146, 149, 150

(56) References Cited

U.S. PATENT DOCUMENTS

| 4,712,991 | * | 12/1987 | Hehl ........................................ 425/146 |
| 5,149,472 | * | 9/1992 | Suganuma ............................ 425/144 |
| 5,316,707 | | 5/1994 | Stanciu et al. ......................... 425/145 |
| 5,513,971 | * | 5/1996 | Nakamura et al. ................... 425/146 |
| 5,516,271 | | 5/1996 | Swenor et al. ........................ 425/144 |
| 5,518,388 | | 5/1996 | Swenor et al. ........................ 425/144 |
| 5,518,390 | | 5/1996 | Nakamura et al. ................... 425/145 |
| 5,551,486 | | 9/1996 | Hauser et al. ....................... 264/328.4 |

FOREIGN PATENT DOCUMENTS 0 729 822  9/1996 (EP) .

* cited by examiner

Primary Examiner—James P. Mackey
Assistant Examiner—Thukhanh T. Nguyen
(74) Attorney, Agent, or Firm—Burns Doane Swecker & Mathis L.L.P.

(57) ABSTRACT

An apparatus for manufacturing composite parts produced by resin transfer molding (RTM) is configured to operate in controlled flow-rate mode or controlled pressure mode to use the RTM technique for manufacturing large-sized composite parts with a low fiber content. In both modes, control is by means of a fuzzy logic control card. In controlled flow-rate mode the resin is injected alternately by two injection cylinders (40a and 40b) controlled by motors whose speed is controlled. In controlled pressure mode the resin is injected directly from resin supply vessels (16) subjected to pressure controlled by an air regulator (30).

10 Claims, 4 Drawing Sheets

APPARATUS FOR MANUFACTURING COMPOSITE PARTS PRODUCED BY RESIN TRANSFER MOLDING

DESCRIPTION

1. Field of the Invention

The present invention relates to an apparatus for manufacturing composite parts produced by resin transfer molding (RTM).

More precisely, the apparatus according to the invention is designed for producing large-size composite parts that may either have a high fiber content, i.e. 58% or greater, or a lower fiber content, i.e. below 54%.

This type of apparatus is particularly used for applications in the aerospace industry in which large-size parts with a high fiber content are used in conjunction with large-size sandwich parts in which the fiber content of the skins covering the core of the sandwich structure is relatively low.

2. Background Art

The RTM technique has been used for many years in fields such as the automobile and producer's goods industries to produce parts with a relatively low fiber content, i.e. lower than 54%. It consists of inserting a dry fibrous preform into a mold and then using low pressure to inject a liquid organic resin into the mold under negative pressure, thereby impregnating the fibrous preform. The impregnated preform is then heated in order to polymerize it before removing it from the mold.

The RTM technique has a number of advantages over other known composite materials techniques: overall operating time is reduced, the investment cost of the production line is low due to the absence of cooling and autoclave systems, part measurements, particularly thickness, can be accurately calibrated, the technique yields excellent surfaces, and health and safety conditions for operators are very good.

In order to produce the type of parts with a high fiber content greater than 58% required by the aerospace industry, the dry preform onto which the resin is injected in the mold must be strongly compressed. However, the RTM procedures in the known art do not allow for the manufacture of large-sized parts with this degree of compression.

The considerable loss of pressure introduced by the compressed textile fibers in the preform inhibits the penetration of resin into the preform.

Moreover, the resin injection pressure must remain low enough for the orientation of the textile fibers in the preform to remain unaffected during the injection procedure; the mechanical characteristics of the part thereby obtained are essentially determined by the orientation of the textile fibers in the resin matrix.

Consequently, when large parts are being manufactured, the time required for the resin to penetrate into the entire fibrous preform exceeds the time the resin takes to polymerize (normally known as the gel time). The highly compressed textile fibers also constitute an obstacle to the penetration of the resin and may leave entire areas of a part unimpregnated as well as leaving bubbles.

For these various reasons the RTM technique is currently little used for the manufacture of large parts with a high fiber content.

Moreover, existing apparatuses that use the RTM technique are usually designed for series production of parts with relatively uniform characteristics, particularly as concerns their measurements and their fiber content. This characteristic of the existing apparatuses also tends to make them very unsuitable for the aerospace industry in which parts with widely differing characteristics are produced in limited series. For example, large parts such as structural components, require a high fiber content, i.e. greater than 58%. In contrast, the manufacture of sandwich parts comprising a core made of a honeycomb material, or foam covered on both sides with a skin, generally uses a relatively low fiber content i.e. less than 54% for the skins.

In the manufacture of resin parts obtained by injection molding, various techniques have been developed to give improved control over the various injection parameters such as flow-rate, pressure, temperature, etc. while taking the shape of the part produced into consideration. Documents U.S. Pat. Nos. 5,178,805, 5,316,707, 4,850,217 and 5,551,486 all disclose certain of these techniques as examples.

However, the specific drawbacks of the RTM technique described above have hitherto prevented the techniques used for RTM injection molded production being adapted to produce large parts with high or low fiber contents as required.

DISCLOSURE OF THE INVENTION

The invention relates precisely to an apparatus for manufacturing composite parts using the RTM technique that will allow relatively simple, cheap production of large parts with a high or low fiber content while ensuring that the parts thereby obtained have a particularly low porosity level (maximum 1 to 3%) without the risk of premature gelling of the resin or the presence of unimpregnated areas within the parts.

According to the invention, this result is obtained by means of an apparatus for manufacturing composite parts by resin transfer molding, characterized by the fact that it comprises:

- at least one mold able to accept a fibrous preform,
- means for compressing the preform in the mold,
- at least one resin supply vessel,
- at least one injection cylinder for injecting the resin into the mold,
- control means capable of operating the apparatus in controlled flow-rate mode in which the resin is transferred from the resin supply vessel to the injection cylinder before being injected into the mold by the cylinder at a generally constant rate, and in which the compressing means generally ensure that the fibrous preform is highly compressed, and in a controlled pressure mode wherein the resin is injected directly into the mold by the resin supply vessel at a generally constant rate and wherein the compressing means generally ensure weak compression of the fibrous preform, and
- means of switching the control means between the controlled flow-rate and controlled pressure modes.

In the apparatus thus defined, the controlled flow-rate mode is used to produce large parts with a fiber content greater than 58% while controlled pressure mode is used to produce large-size sandwich parts in which the skins have a fiber content less than 54%.

In a preferred embodiment of the invention, the control means act on a three-way valve comprising one inlet connected to the resin supply vessel, a first outlet connected to the injection cylinder and a second outlet connected to the mold. The inlet of the three-way valve is connected to the first outlet in controlled flow-rate mode and to the second outlet in controlled pressure mode.

The control means advantageously act upon means for pressurizing the resin supply vessel so that constant pressure is applied to the vessel in controlled flow-rate mode while variable pressure is applied to the vessel in controlled pressure mode.

In order to manufacture large-size parts while reducing the risk of the resin starting to polymerize in the resin supply vessel (this risk is increased the greater the volume and the diameter of the vessel), several resin supply vessels are preferably used. These vessels are connected in parallel in a tank connected to pressurizing means. Each resin supply vessel is then connected in turn to the inlet of the three-way valve via a valve commanded by the control means.

The injection cylinder is normally controlled by an electric motor fitted with a speed regulator. The control means act on the speed regulator in controlled flow-rate mode so that the injection cylinder injects a controlled flow of resin into the mold.

In the preferred embodiment of the invention a first pressure sensor supplying a first instantaneous signal is located on the mold inlet. The control means also comprise a first comparator means that supply a first input signal representative of the deviation between a maximum pressure setting and the first instantaneous signal, a second comparator means that supplies a second input signal representative of the difference between two consecutive first input signals, and at least one fuzzy logic control card that, in controlled flow-rate mode, uses the first and second input signals to supply a flow-rate control signal.

A second pressure sensor is preferably located on the outlet of each injection cylinder and supplies a second instantaneous signal. The control means comprise a third comparator means that supply a third input signal representative of the difference between a maximum permissible pressure on the outlet of the injection cylinder and the second instantaneous signal, the flow-rate control signal being generated by the fuzzy logic control card, also using the third input signal.

The control means thus comprise first limiting means that compare the flow-rate control signal with a reference flow-rate signal to supply a flow-rate control signal to the speed regulator that is equal to the reference flow-rate signal when said signal is less than the flow-rate control signal, and equal to the flow-rate control signal if not.

Flow-rate measuring means are also located between the second outlet of the three-way valve and the mold and supply a third instantaneous signal. Control means comprising a fourth comparator means supplying a fourth input signal flow-rate control signal representative of the difference between a maximum permissible flow-rate and the third instantaneous signal and a fifth comparator means supplying a fifth input signal representative of the difference between two consecutive fourth input signals, the fuzzy logic control card using the fourth and fifth input signals to supply a pressure-regulating signal in controlled pressure mode.

The control means thus comprise second limiting means that compare the pressure control signal with a reference pressure signal to supply pressurizing means with a pressure control signal equal to the reference pressure when the latter is less than the pressure control signal and equal to the pressure control signal if not.

In the preferred embodiment of the invention two injection cylinders are mounted in parallel between a second three-way valve comprising a inlet connected to the resin supply vessel and a third three-way valve comprising an outlet connected to the mold. In controlled flow-rate mode, the control means actuate these second and third three-way valves so that one of the injection cylinders is connected to the resin supply vessel and isolated from the mold while the other injection cylinder is connected to the mold and isolated from the resin supply vessel, and conversely. This arrangement makes it possible to inject resin continuously into the mold from each injection cylinder alternately. It is therefore particularly well suited to the manufacture of large-sized parts and contributes to reducing the risks of the resin starting to polymerize in the cylinders.

In this situation a second pressure sensor is located on the outlet of each injection cylinder and the third input signal injected on the fuzzy logic control card is representative of the difference between the maximum permissible pressure on the outlet of the cylinders and the second instantaneous signal supplied by the second pressure sensor associated with the injection cylinder connected to the mold.

BRIEF DESCRIPTION OF THE DRAWINGS

The following description is of a non-limitative example of a preferred embodiment of the invention and refers to the attached figures where.

DETAILED DISCLOSURE OF A PREFERRED EMBODIMENT

Figure 1:
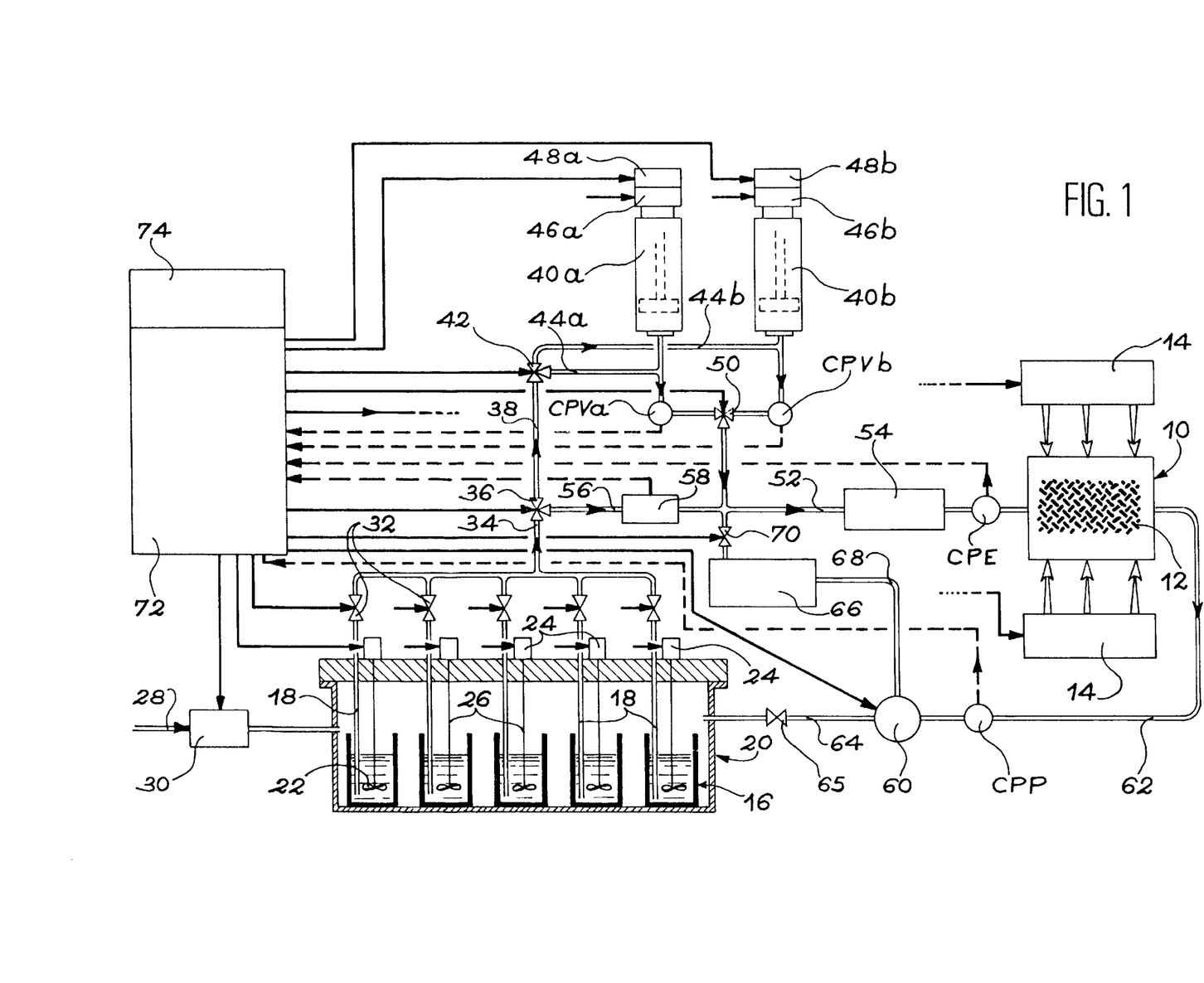
FIG. 1 is a synoptic diagram showing an apparatus for manufacturing composite parts according to the invention.

In the preferred embodiment shown schematically in FIG. 1, the apparatus according to the invention comprises one or more molds 10 suitable for manufacturing composite parts using resin transfer molding. The cavity (not shown) of each mold 10 is constructed so that its shape and measurements correspond to the external characteristics of the part to be produced. The cavity is designed to accept a fibrous preform 12 made of preassembled dry organic fibers. Each mold 10 is fitted with heating means (not shown) designed to maintain the mold at the required temperature during injection of the resin and to subject it to a polymerization cycle when the injection phase has been completed.

Each mold 10 is also fitted with compression means indicated by arrows 14 in FIG. 1. These compression means 14 are designed to apply a controlled compression force with an adjustable value to fibrous preform 12. As a non-limitative example, said compression means 14 may comprise one or more inflatable bladders placed with fibrous preform 12 in the cavity of mold 10 as disclosed in document FR-A-2 720 028.

For the purposes of clarity, FIG. 1 shows the simplest embodiment of the invention with only one mold 10. When several molds 10 are used, i.e. when several parts are manufacture simultaneously, the molds are disposed in parallel so that the resin is injected simultaneously into each mold.

According to the invention, the apparatus can operate in two different modes, enabling it to be used for producing parts with different characteristics as required. The first mode, known as controlled flow-rate mode, is used to produce large parts with a high fiber content, i.e. greater than 58%. A second mode, known as controlled pressure mode, is used to produce large parts, normally sandwich-type components, with a relatively low fiber content, i.e. less than 54%. When several parts are produced simultaneously in several molds 10 the operation of the apparatus in one or other of these two modes requires that all the parts be of the same type, i.e. either large parts with a high fiber content or sandwich parts with a low fiber content.

When the part or parts produced by the apparatus are large parts with a high fiber content, fibrous preform 12 fills virtually the whole of the cavity inside each mold 10, as shown schematically in FIG. 1.

In contrast, when the part or parts produced by the apparatus are sandwich parts, fibrous preform 12 comprises a central core made of a honeycomb material or foam, both sides of which are covered with a dry fiber preform. In this type of production precautions are taken such as inserting a leaktight film to prevent the resin penetrating the honeycomb or foam core when it is injected into the dry fiber preforms designed to form the skins of the parts.

In the embodiment of the invention shown in FIG. 1, in which large-size parts are produced, the apparatus comprises several resin supply vessels 16. The resin supply vessels 16 are usually relatively small (e.g. 5 liter) cylindrical vessels in which the transfer pipes 18 are immersed vertically. These transfer pipes carry the resin when pressure is applied to the surface of the resin.

The use of several resin supply vessels 16 is justified by the fact that the risk of polymerization of the resin starting to occur in the recipient containing it increases the greater the volume and diameter of the recipient.

All the resin supply vessels 16 required to produce one or more parts are placed in the same tank 20. This tank is leaktight and capable of withstanding an internal pressure of several bar. The bottom of the tank, as well as the area surrounding the vessels 16, is fitted with means (not shown) for heating the resin contained in the vessels. Said heating means may be of any type, for example electrical resistors.

Weighing means (not shown) are preferably fitted inside tank 20 to measure the individual weight of each vessel 16.

As shown schematically in FIG. 1, a stirring apparatus 22 is placed inside each resin supply vessel 16. Each stirring apparatus 22 is driven by an electric motor 24 located above tank 20 via a vertical shaft 26 that passes through the cover of tank 20.

A compressed air pipe 28 opens into tank 20 in order to pressurize the tank. Said pipe 28 is fed by a compressed air source (not shown) such as the standard supply of the plant in which the apparatus is installed.

An air regulator 30 fitted with a proportional valve is fitted to the compressed air pipe 28 so that the pressure applied to resin supply vessels 16 inside tank 20 can be controlled instantaneously and accurately. Compressed air pipe 28 and its air regulator 30 constitute the means for pressurizing resin supply vessels 16.

Outside tank 20 each transfer pipe 18 is fitted with a solenoid valve 32 that makes it possible to use each resin supply vessel 16 in turn during operation of the apparatus. Downstream of solenoid valves 32, all the transfer pipes 18 are connected to a single resin supply pipe 34.

Resin supply pipe 34 is connected to the inlet of a first three-way valve 36 that modifies the routing of the resin in the apparatus depending on which operating mode is being used.

Three-way valve 36 comprises a first outlet to which is connected a pipe 38 that supplies two resin injection cylinders 40a and 40b alternately via a second three-way valve 42. More precisely, pipe 38 is connected to the inlet of three-way valve 42 which comprises a first outlet connected to the pressure chamber of cylinder 40a via pipe 44a and a second outlet connected to the pressure chamber of cylinder 40b via pipe 44b.

The two cylinders 40a and 40b are identical and each has a limited capacity, for example approximately 10 liters. The use of low-capacity cylinders helps reduce the risk of resin starting to polymerize inside the components.

As will be seen in more detail below, cylinders 40a and 40b are only actuated when the apparatus operated in controlled flow-rate mode. The cylinders 40a and 40b are used alternately to inject resin into mold or molds 10. More precisely, when a mold requires a quantity of resin greater than 10 liters, the cylinder not being used for injection is being filled and vice versa.

Each cylinder 40a and 40b is controlled by an electric motor 46a, 46b fitted with a speed regulator 48a, 48b respectively.

Pipe 44a connecting the first outlet of three-way valve 42 to cylinder 40a is also connected to a first inlet of a third three-way valve 50. Similarly, pipe 44b connecting the second outlet of three-way valve 42 to cylinder 40b is connected to a second inlet of three-way valve 50. Three-way valve 50 has a single outlet connected to the inlet of the mold or molds 10 by an injection pipe 52 via a heat exchanger 54. Heat exchanger 54 is used to heat the resin to the temperature required on the inlet of mold 10 by means, for example, of controlled temperature heat exchange.

The first three-way valve 36 comprises a second outlet connected directly to injection pipe 52, between three-way valve 50 and heat exchanger 54 via a shunt pipe 56. This shunt pipe 56 is fitted with a flow-rate meter 58 that produces an instantaneous electric signal QE representative of the value of the flow rate of resin in shunt pipe 56.

A vacuum pump 60 is connected to each mold 10 via a suction pipe 62 that opens into each mold on the opposite side to injection pipe 52. A pipe 64 also connects a suction aperture of vacuum pump 60 to tank 20. This acts to create negative pressure in the tank during the initial debulking phase of the resin contained in the resin supply vessels 16. Pipe 64 is fitted with a valve 65 that is normally in the closed position during transfer of resin.

Vacuum pump 60 may also be used to bleed cylinders 40a and 40b into an interchangeable recovery trough 66 once an injection cycle in controlled flow-rate mode has been completed. A similar bleeding operation may also be effected when incipient polymerization accidentally occurs in one or other of the cylinders. This is effected by means of a suction aperture of vacuum pump 60 connected to injection pipe 52 between the third three-way valve 50 and heat exchanger 54 via a bleed pipe 68 connected to trough 66. Said bleed pipe 68 is fitted with a solenoid valve 70 that is normally closed upstream of trough 66.

The apparatus of the invention is fitted with a first pressure sensor referred to as CPE. Pressure sensor CPE is fitted in injection pipe 52 between heat exchanger 54 and mold or molds 10. It supplies an electric signal representative of the instantaneous pressure on the inlet of mold or molds 10. This signal will be referred to as the "first instantaneous signal PE".

The apparatus also comprises two pressure sensors CPVa and CPVb, located respectively in pipes 44a and 44b, between cylinders 40a and 40b and the third three-way valve 50. Each of these pressure sensors CPVa and CPVb supplies an electric signal representative of the instantaneous pressure on the outlet of cylinders 40a and 40b respectively. These signals will be referred to as the "second instantaneous signals PVa and PVb".

The apparatus shown in FIG. 1 also comprises a negative pressure sensor CPP, located on suction pipe 62 immediately upstream of vacuum pump 60. Negative pressure sensor CPP supplies an electric signal representative of the instantaneous pressure on the suction aperture of vacuum pump 60.

The apparatus according to the invention also comprises control means 72 that are fitted with switching means 74. Control means 72 receive the electric signals supplied by the various sensors and transmitters with which the apparatus is equipped. Dotted lines have been used in FIG. 1 to illustrate how control means 72 receive instantaneous signals supplied by flow-rate meter 58 and sensors CPE, CPVa, CPVb and CPP.

Moreover, control means 72 act on the various active components of the apparatus, depending on the status of switching means 74. These effects are shown schematically by unbroken arrows in FIG. 1. The active components particularly affected by control means 72 include compression means 14, air regulator 30, first three-way valve 36 and speed regulators 48a and 48b. They also include stirring apparatus motors 24, solenoid valves 32, vacuum pump 60 and second and third three-way valves 42 and 50.

The switching means 74 are composed of a switching device that can be actuated by an operator in order to switch control means 72 between controlled flow-rate mode and controlled pressure mode depending on the type of parts being produced.

The main components of control means 72 and their operation in both controlled flow-rate and controlled pressure mode will now be described in detail with reference, successively, to FIGS. 2 and 3.

Figure 2:
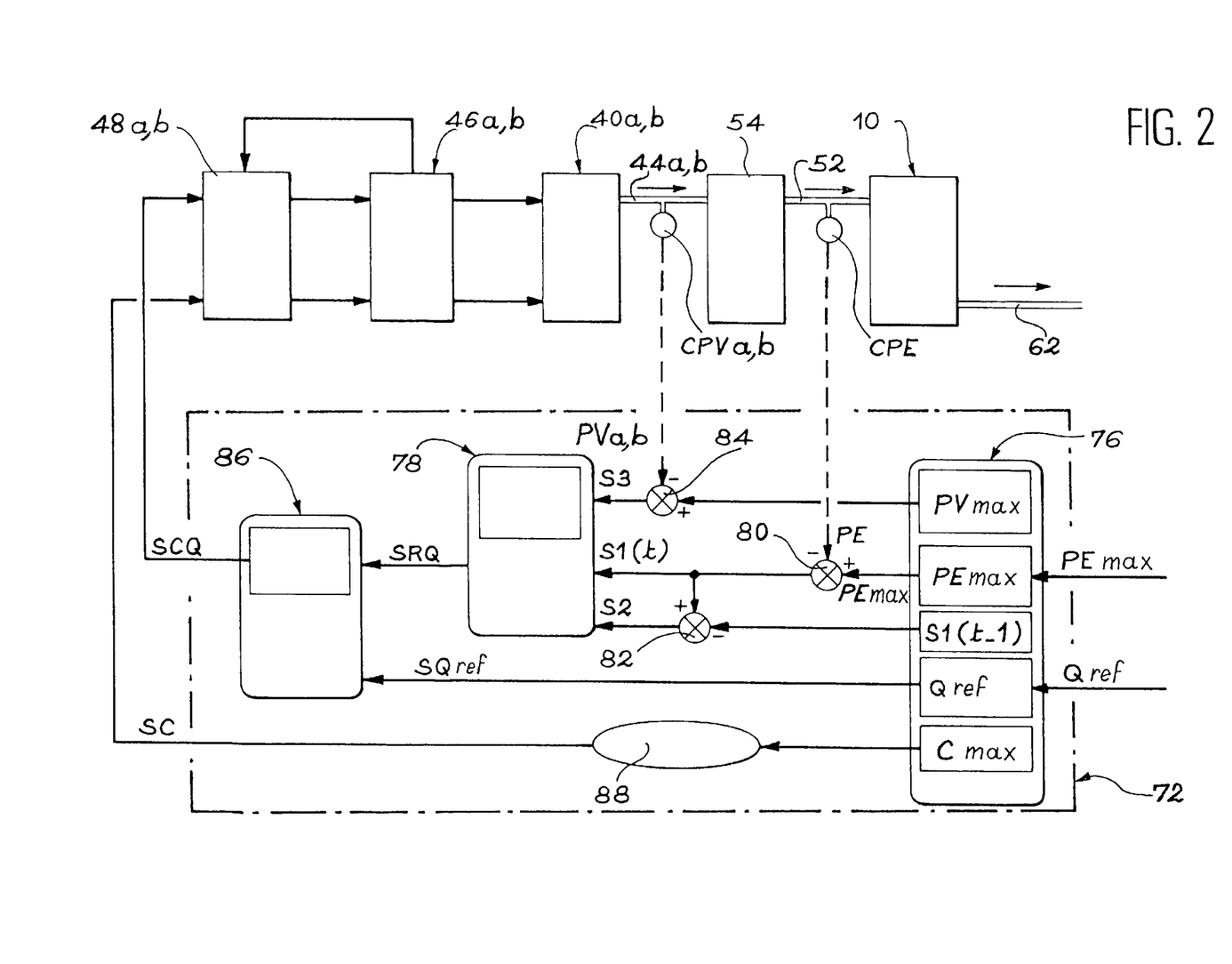
FIG. 2 is a block diagram showing more detail of the operation of the control means when the apparatus of FIG. 1 is in controlled flow-rate mode.

More precisely, FIG. 2 shows the effect of control means 72 alternately on speed regulators 48a and 48b of injection cylinders 40a and 40b during injection of the resin into mold 10 at a flow rate that is generally constant when the apparatus is in controlled flow-rate mode. FIG. 3 shows the effect of control means 72 on air regulator 30 in order to inject the resin directly into mold 10 at a generally constant pressure when the apparatus is in controlled pressure mode.

In controlled flow-rate mode (FIG. 2), resin is injected alternately by injection cylinders 40a and 40b, as explained above. To simplify matters, speed regulators 48a and 48b of injection cylinders 40a and 40b, that are controlled alternately, are shown as a single rectangle, 48a, b.

Figure 3:
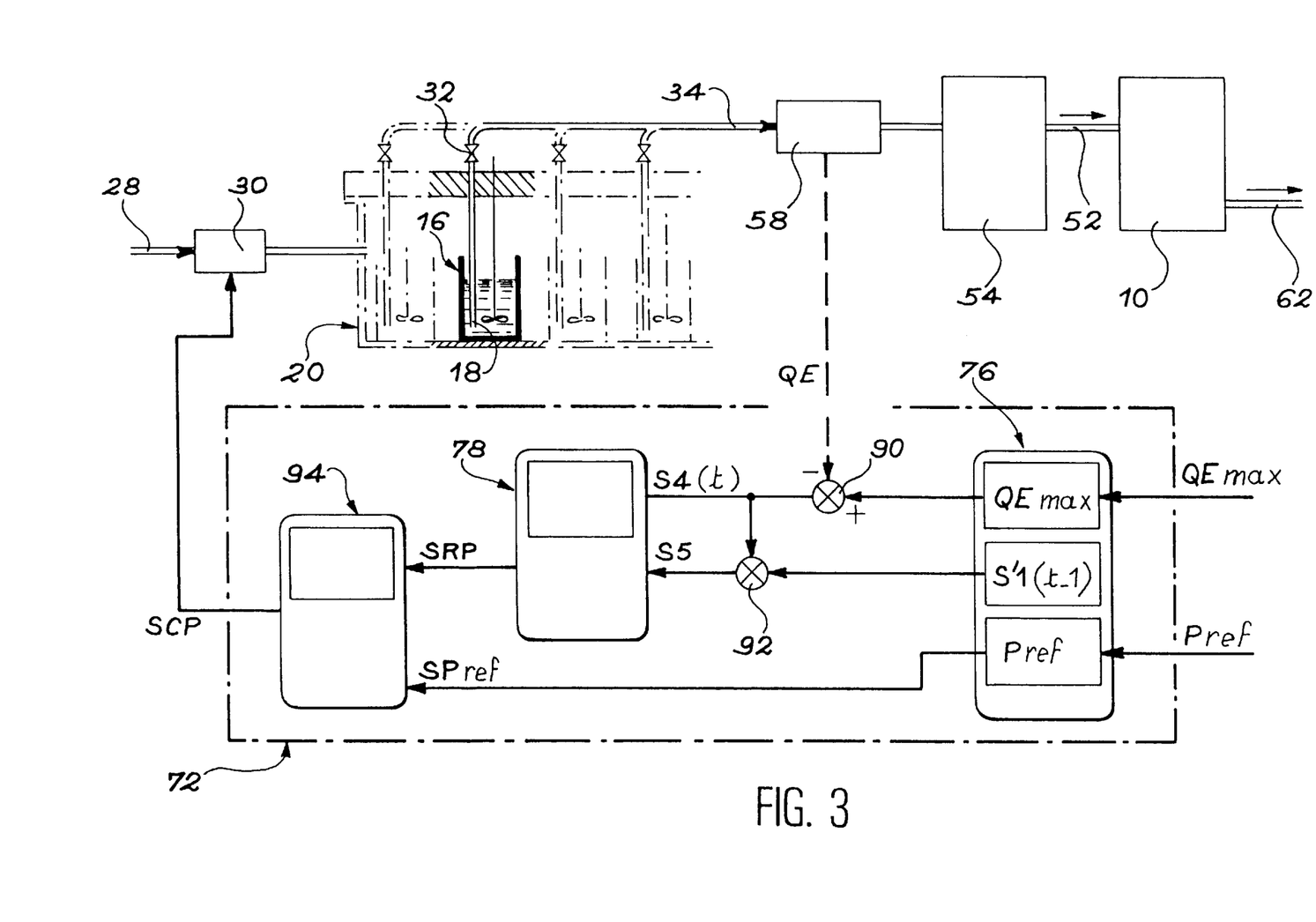
FIG. 3 is a block diagram similar to FIG. 2 showing the operation of the control means in controlled pressure mode.

The control means 72 shown in FIGS. 2 and 3 comprise a programmable logic controller 76 that, depending on the operating mode selected, controls the flow-rate or pressure regulation function by means of one or more fuzzy logic control cards 78. The various parameters of the fuzzy logic control card 78 may be configured as required via programmable logic controller 76.

FIGS. 2 and 3 show schematically that programmable logic controller 76 is fitted with input components such as thumbwheels that can be used to enter various settings into the system.

In controlled flow-rate mode (FIG. 2), a first maximum pressure setting PEmax is the maximum pressure permissible on the inlet of the mold or molds 10 used. This PEmax setting is determined essentially by the characteristics of the parts to be produced. A second setting Qref is the reference flow-rate to which injection of the resin is to be set. This reference flow-rate is selected according to the volume of the mold or molds to be filled and the gel time of the resin at the injection temperature selected.

Other settings determined by the intrinsic characteristics of the apparatus are permanently stored in programmable logic controller 76. When the apparatus operates in controlled flow-rate mode (FIG. 2) these settings include, in particular, pressure setting PVmax which is the maximum pressure permissible on the outlet of each of the injection cylinders 40a and 40b, given their mechanical characteristics. They also include a setting Cmax which is the maximum torque permissible for each electric motor 46a and 46b.

As shown schematically by reference 80 of FIG. 2, the programmable logic controller 76 computes in real time a first input signal $S1(t)$ that is representative of the difference or deviation $\Delta PE$ between the maximum pressure setting PEmax and the first instantaneous signal PE supplied by sensor CPE located on the inlet of mold 10. This first input signal $S1(t)$ constitutes one of the input magnitudes injected into the fuzzy logic control card 78 in controlled flow-rate mode.

As shown by reference 82 of FIG. 2, programmable logic controller 76 also generates in real time a second input signal S2 that is representative of the difference ERPE between two consecutive signals S1, i.e. the rate of variation of first input signal S1. More precisely, this second input signal S2 is equal to the difference between the last input signal S1, calculated at time t, and the input signal S1 immediately preceding it, calculated at time t-1. The second input signal S2 also constitutes an input magnitude injected into the fuzzy logic control card 78 in controlled flow-rate mode.

In the embodiment shown in FIG. 2 a third input magnitude is also injected into the fuzzy logic control card 78. This magnitude consists of a third input signal S3. This third input signal S3 is representative of the difference or deviation $\Delta PV$ between the maximum pressure setting PVmax permissible on the injection cylinders 40a and 40b and the instantaneous value of pressure PVa, PVb measured by sensor CPVa and CPVb on the outlet of injection cylinders 40a and 40b during injection.

The third input signal S3 is also generated by the programmable logic controller 76 as shown by reference 84 in FIG. 2.

When the apparatus operates in controlled flow-rate mode, the fuzzy logic control card 78 permanently generates a flow-rate control signal SRQ using the three input signals S1, S2 and S3. The essential characteristics of the rules governing the generation of signal SRQ will be described briefly below as an example.

In practice, flow-rate control signal SRQ is a speed signal that establishes at any time the speed at which electric motor 46a or 46b of the cylinder being used to inject must be actuated to comply with the rules contained in fuzzy logic control card 78.

As shown by reference 86 of FIG. 2, when the apparatus operates in controlled flow-rate mode, the programmable logic controller of the control means compares the flow-rate control signal SRQ with a reference flow-rate signal SQref that is representative of the reference flow-rate Qref entered previously on the programmable logic controller. The control means then generate a flow-rate control signal SCQ that is equal to signal SQref as long as the flow-rate control signal SRQ is greater than or equal to said signal SQref, and equal to flow-rate control signal SRQ when signal SRQ is less than signal SQref. The flow-rate control signal SCQ is a speed signal that is injected into the speed regulators 48a or 48b of injection cylinders 40a or 40b during resin injection.

As can be seen from FIG. 3, when the apparatus is operated in controlled pressure mode a setting QEmax for the maximum permissible flow-rate on the inlet of mold 10, together with a setting Pref that is the reference pressure at which injection is to be effected, is entered on programmable logic controller 76.

As shown schematically by reference 90 of FIG. 3, the programmable logic controller 76 computes in real time a fourth input signal S4(t) that is representative of the difference or deviation ΔQE between the maximum flow-rate setting QEmax and the instantaneous signal QE supplied by flow-rate meter 58. This fourth input signal S4(t) constitutes one of the input magnitudes injected into the fuzzy logic control card 78 in controlled pressure mode.

As shown by reference 92 of FIG. 3, programmable logic controller 76 also generates a fifth input signal S5 that is representative of the difference ERQE between two consecutive signals S4, i.e. the rate of variation of fourth input signal S4. More precisely, this fifth input signal S5 is equal to the difference between the last input signal S4, calculated at time t, and the input signal S4 immediately preceding it, calculated at time t-1. The fifth input signal S5 also constitutes an input magnitude injected into the fuzzy logic control card 78 in controlled pressure mode.

When the apparatus operates in controlled pressure mode, the fuzzy logic control card 78 permanently generates a pressure control signal SRP using input signals S4 and S5. This pressure control signal SRP permanently determines the pressure to be applied to the resin supply vessel 16 being used to inject in order to comply with the rules contained in fuzzy logic control card 78.

As shown by reference 94 of FIG. 3, when the apparatus operates in controlled pressure mode, the programmable logic controller of the control means 72 compares the flow-rate control signal SRP with a signal SPref that is representative of the reference pressure Pref entered previously on the programmable logic controller. The control means 72 then generate a pressure control signal SCP that is equal to signal SPref as long as the pressure control signal SRP is greater than or equal to said signal SPref and equal to pressure control signal SRP when signal SRP is less than signal SPref. The pressure control signal SCP is injected into the air regulator 30 in order to adjust the opening of the proportional valve it contains.

Once the one or more molds 10 have been connected between injection pipe 52 and suction pipe 62 (FIG. 1), the operator can select either controlled flow-rate mode or controlled pressure mode depending on the characteristics of the parts being produced. As has already been explained above, controlled flow-rate mode is used to produce large-sized parts with a high fiber content, typically greater than 58%. Controlled pressure mode, on the other hand, is used to produce sandwich parts in which the skins have a relatively low fiber content, typically less than 54%, in order to limit the force due to the injection pressure on the honeycomb or foam core. Switching means 74 are actuated to set the apparatus to the required mode.

When controlled flow-rate mode is selected, the first three-way valve 36 is automatically set to the state in which resin supply pipe 34 is connected to cylinder supply pipe 38.

The proportional valve of air regulator 30 is also set to its maximum open state, giving a pressure of several bar. Finally, control means 72 act on compression means 14 to ensure that fibrous preform 12 is compressed strongly enough to obtain a fiber content greater than 58% when said compression means 14 are actuated.

Use of the apparatus in controlled flow-rate mode also has the effect of initially opening at least one of the solenoid valves 32 while maintaining the other solenoid valves 32 closed. At the same time the second and third three-way valves 42 and 50 are actuated so that one of the cylinders, for example cylinder 40a, is initially connected to the resin supply vessel 16 that corresponds to the open solenoid valve 32 while remaining isolated from mold 10, while the other cylinder, for example cylinder 40b, is, in contrast, isolated from the resin supply vessels 16 and connected to mold 10.

During a preliminary operating phase, the cylinder, for example cylinder 40a, that is initially connected to one of the resin supply vessels 16, fills with resin due to the effect of the compressed air introduced into tank 20 by pipe 28. Given the relative volumes of the resin supply vessels 16 and injection cylinders 40a and 40b, cylinder 40a is usually filled using approximately the contents of two resin supply vessels 16. This may be achieved either by opening two solenoid valves 32 simultaneously or by opening one solenoid valve, then the other once the first has been closed.

Once this preliminary stage is complete, the control means 72 simultaneously command the reversal of the states of second and third three-way valves 42 and 50. Consequently, a cylinder, for example cylinder 40a that has just been filled, is isolated from the resin supply vessels 16 and connected to mold 10. Conversely, the other cylinder, for example cylinder 40b, is in turn connected to one or more resin supply vessels 16 for filling.

As soon as injection of resin from one of the injection cylinders, for example cylinder 40a, into mold 10 begins, the speed of the cylinder's electric motor 46a is continuously regulated by speed regulator 48a governed by the flow-rate control signal SCQ supplied by control means. The injection flow-rate of the resin into mold 10 remains constant and equal to the reference flow-rate Qref as long as the flow-rate control signal SRQ is greater than the signal SQref representing this flow-rate setting. In contrast, when the value of the flow-rate control signal SRQ is less than that of the signal SQref, the speed of electric motor 46a is regulated so that injection of resin into mold 10 occurs at a flow-rate q lower than the flow-rate setting Q. Injection flow-rate q thus varies with the value of signal SRQ. As will be seen below, this flow-rate control signal SRQ is determined by fuzzy logic control card 46, mainly using instantaneous pressure PE measured on the inlet of mold 10.

In practice, it should be noted that the instantaneous pressure on the inlet of the mold increases progressively as injection progresses until it reaches pressure setting PEmax. This pressure increase is due to the presence of the compressed preform 12 that causes resistance to the progress of the resin to increase as it fills the mold. Injection continues at a constant flow-rate until pressure setting PEmax is reached.

When pressure setting PEmax is reached, return to injection at constant flow-rate is impossible unless at least one other injection characteristic is modified. In the apparatus described this is achieved by temporarily reducing the pressure applied to preform 12 by compression means 14. This reduction in pressure causes the instantaneous pressure PE on the inlet of the mold to drop immediately below pressure setting PEmax. Consequently control means 72 cause the injection flow-rate of resin into the mold immediately to increase to return to the value of setting Qref.

Compression means 14 are then actuated to restore the high pressure applied to preform 12.

When the apparatus is operated in controlled flow-rate mode, injection of the resin into the mold or molds is performed alternately by cylinders 40a and 40b. This alternation is due to the change of state of the second and third three-way valves 42 and 50 that is automatically commanded by control means 72 as soon as one of the cylinders is nearly empty. This data is sent automatically to the control means 72 by the sensors (not shown). Working within the limits of the resin gel time, large parts can thus be produced without having to use the sort of large-size cylinders that are costly and tend to cause premature polymerization of the resin.

This operating mode is made possible by the fact that injection of resin into the mold by one of the cylinders is accompanied simultaneously by the filling of the other cylinder from one or more resin supply vessels 16.

To conclude the description of the apparatus operating in controlled flow-rate mode, it will be seen from FIG. 2 that speed regulators 48a and 48b also receive a signal SC that represents the maximum torque Cmax permissible for each electric motor 46a and 46b. This signal SC is derived directly from the maximum torque value Cmax entered on the programmable logic controller of control means 72 after passing through scaling circuit 88.

When the operator decides to produce the type of parts that require the apparatus to operate in controlled pressure mode by using switching means 74, the first three-way valve 36 is automatically set to its second state in which resin supply pipe 34 is connected directly to shunt pipe 56, which connects it to mold 10 without using the cylinders; the cylinders are excluded from the circuit.

In controlled pressure mode, the pressure applied to fibrous preform 12 by compression means 14 is automatically set to a relatively low value, giving a fiber content lower than 54%. In addition, control means 72 are regulated to command the opening of the proportional valve built into air regulator 30 in order to ensure that the pressure of the resin entering mold 10 is generally constant.

In controlled pressure mode, the resin is continuously injected directly into the mold or molds 10 from one or more resin supply vessels 16 in succession due to the successive opening of solenoid valves 32. The injection pressure is set by the value of the pressure in tank 20, i.e. by the degree to which the proportional valve of air regulator 30 is opened.

In order to eliminate any risk of interruption in resin injection while switching from one resin supply vessel 16 to another by means of solenoid valves 32, the solenoid valves are automatically controlled by control means 72 using data supplied, for example, by weighing means (not shown) associated with the resin supply vessels 16, or by the flow-rate meter 58 before the resin supply vessels are completely empty.

When the resin is injected into the mold or molds 10 in controlled pressure mode, the proportional valve of air regulator 30 is continuously regulated by the pressure signal SCP supplied by control means 72. The injection pressure of the resin in the mold or molds 10 thus normally remains constant and equal to the reference pressure Pref as long as the pressure regulation signal SRP is greater than the signal SPref representing this pressure setting. In contrast, the control means 72 actuate the proportional valve of air regulator 30 so that the injection of resin into the mold or molds 10 takes place at a pressure p that is less than the pressure setting Pref when the value of the pressure control signal SRP is lower than that of the Pref signal. Injection pressure p thus changes according to the value of the signal SRP.

In this controlled pressure mode, the pressure control signal SRP is set by the fuzzy logic control card 78 only using the instantaneous value QE of the flow-rate measured by flow-rate meter 30 on the inlet of the mold or molds 10.

The flow-rate control signal SRQ and pressure control signal SRP are generated in the fuzzy logic control card or cards 78 in virtually the same way. The essential difference lies in the fact that the flow-rate control signal SRQ is generated using the three input signals S1, S2 and S3 while the pressure control signal SRP is only generated using the two input signals S4 and S5. The description that will now be given to explain the operation of fuzzy logic control card 78 in generating the flow-rate control signal SRQ using the three input signals S1, S2 and S3 can therefore easily be extended to understand how fuzzy logic control card 78 generates the pressure control signal SRP.

In controlled flow-rate mode, the use of fuzzy logic is justified by the need to handle two pressure settings simultaneously, namely PE on the inlet of the mold and PV on the outlet of the cylinders. Irrespective of the operating mode, fuzzy logic is also useful for controlling injection without the need to know the exact mathematical modeling of each factor: speed regulators, electric motors, reducers associated with motors, cylinders, pipework, heat exchanger, air regulator, resin supply vessels, valves, resins, etc.

The fuzzy logic processing carried out by the control card or cards 78 can be roughly broken down into three stages:

the transformation of each instantaneous input signal S1, S2 and S3 (or S4, SR in controlled pressure mode) into a fuzzy part; this is the input stage, the transformation of the fuzzy parts derived from the input signals into a fuzzy part that is representative of the output signal; this is the inference stage, and the transformation of the fuzzy part produced during the inference stage into an instantaneous output signal SRQ (or SRP in controlled pressure mode); this is the output stage.

This processing operation makes it possible to model the know-how of operators skilled in using resin transfer molding systems. In practice, this modeling is obtained on the basis of logic rules that describe the possible conditions of the system and the actions appropriate to those conditions in terms of fuzzy logic.

The transformations brought about during the input and output stages are effected by allocating membership functions to each input magnitude and the output magnitude. These membership functions are fuzzy sets defined mathematically by functions that are generally triangular or trapezoidal.

For example, in fuzzy logic control card 78 the instantaneous value of each signal S1, S2 and S3 (or S4 and SR in controlled pressure mode) is compared with membership functions defined beforehand for each of the following input magnitudes: $\Delta PE$, ERPE, $\Delta PV$ (or $\Delta QE$ and ERQE in controlled pressure mode).

In the embodiment described, the membership function allocated to the deviation $\Delta PE$ (or $\Delta QE$ in controlled pressure mode) between pressure setting Pemax (or flow-rate QEmax) and instantaneous pressure PE (or instantaneous flow-rate QE) on the inlet of mold or molds 10 are: high negative (Ng), medium negative (Nm), low negative (Np), zero (Ze), low positive (Pp) medium positive (Pm) and high positive (Pg).

Similarly, the membership function allocated to the deviation ERPE (or ERQE in controlled pressure mode) corresponding to the difference between two consecutive first signals S1 (or between two consecutive fourth signals S4) are: high negative (Ng), medium negative (Nm), low negative (Np), zero (Ze), low positive (Pp), medium positive (Pm) and high positive (Pg).

Finally, the only membership function allocated to the input magnitude ΔPV that is representative of the difference between the maximum pressure permissible on the outlet of the injection cylinders 40a and 40b, PVmax and instantaneous pressure PV measure on the outlet of the cylinder is: bad (this magnitude has no equivalent in controlled pressure mode).

Membership functions are also allocated to the output magnitude in the fuzzy logic control card 78. These consist of changes ΔSRQ in the rotation speed of electric motor 46a or 46b (or ΔSRP in the opening of the proportional valve of air regulator 30 in controlled pressure mode), represented by flow-rate control signal SRQ (or SRP in controlled pressure mode). In the embodiment described, the functions allocated to the output magnitude are: high negative (Ng), medium negative (Nm), low negative (Np), zero (Ze), low positive (Pp), medium positive (Pm) and high positive (Pg).

The membership functions of the input magnitudes are related to the membership functions of the output magnitude by a table of rules. If the influence of input magnitude ΔPV, which only rarely has any effect, is ignored, the table of rules has two inputs, ΔPE and ERPE, and one output, ΔSRQ. This table of rules is drawn up experimentally and may take the following form:

TABLE OF RULES

| ΔSRQ | | Ng | Nm | Np | Ze | Pp | Pm | Pg |
|---|---|---|---|---|---|---|---|---|
| | | | | | ERPE | | | |
| ΔPE | Ng | Ng | Ng | Ng | Ng | Ng | Ng | Ng |
| | Nm | Ng | Ng | Ng | Ng | Nm | Nm | Nm |
| | Np | Nm | Nm | Nm | Np | Ze | Ze | Ze |
| | Ze | Ze | Ze | Ze | Ze | Ze | Ze | Ze |
| | Pp | Ze | Ze | Ze | Pp | Pm | Pm | Pm |
| | Pm | Pm | Pm | Pm | Pg | Pg | Pg | Pg |
| | Pg | Pg | Pg | Pg | Pg | Pg | Pg | Pg |

Moreover, the only rule that relates input magnitude ΔPV to the output magnitude ΔSRQ is:

if ΔPV=BAD, then ΔSRQ=Ng.

This rule has priority, i.e. it is imposed irrespective of the values of the other input magnitudes.

The membership functions allocated to deviation ΔPE, variation rate ERPE, deviation ΔPV and modification ΔSRQ to be made to the rotation speed of electric motor 46a or 46b are shown in FIGS. 4A, 4B, 4C and 4D respectively.

For input magnitudes ΔPE and ERPE (FIGS. 4A and 4B), the membership functions are, for example, in the shape of identical isosceles triangles that partially overlap with one another, whose bases lie on the axis of the abscissas and that are regularly offset in relation to the other triangles. The instantaneous value of the corresponding magnitude is plotted or read on the axis of the abscissas depending on whether the magnitudes are inputs or outputs. The axis of the ordinates determines the degree of membership of the magnitude with each function; the height of the isosceles triangles represents the functions corresponding to the unit. The measurements and angles of the bases of the triangles are established experimentally.

In the case of the input magnitude ΔPV (4C), the membership function BAD has the shape of a rectangular trapezoid whose height corresponds to that of the unit.

Figure 4A:
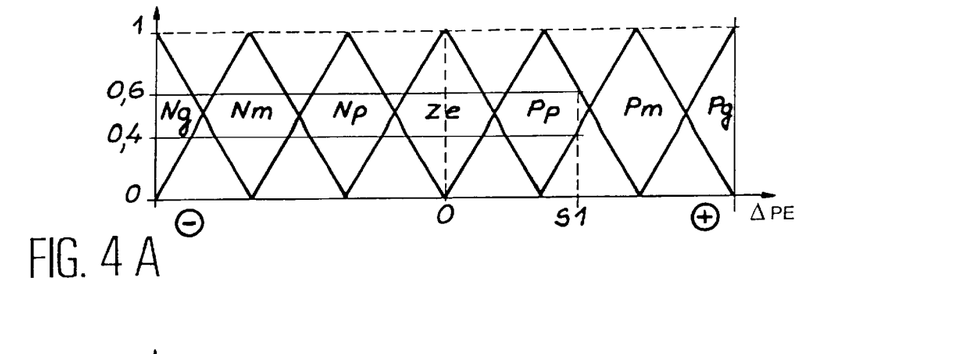
FIGS. 4A, 4B, 4C and 4D show the membership functions of the three input magnitudes and the output magnitude of the fuzzy logic control card used in the control means of the apparatus in controlled flow-rate mode.
Figure 4B:
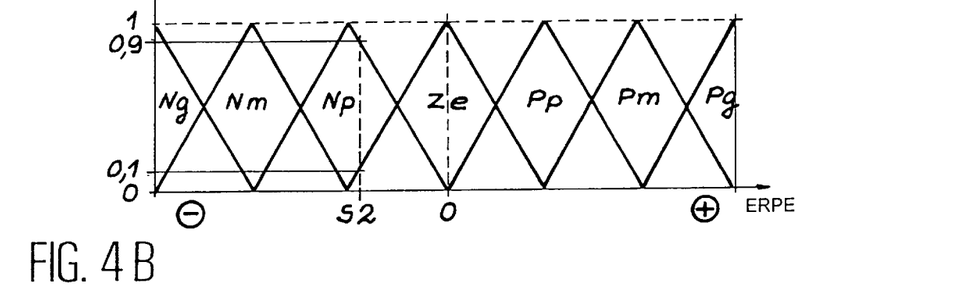
Figure 4C:
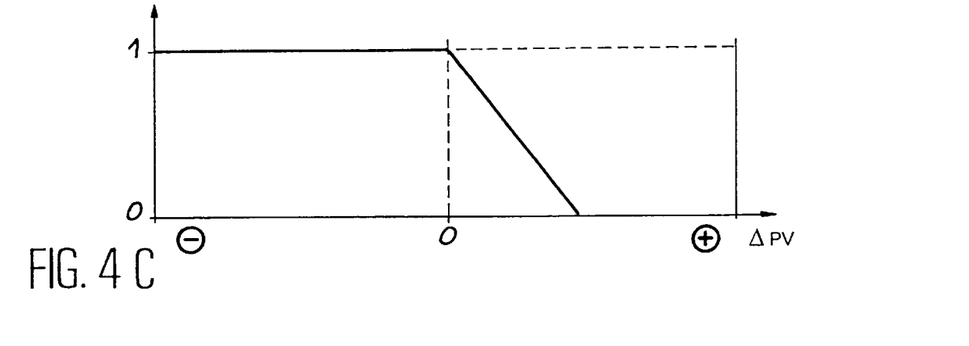
Figure 4D:
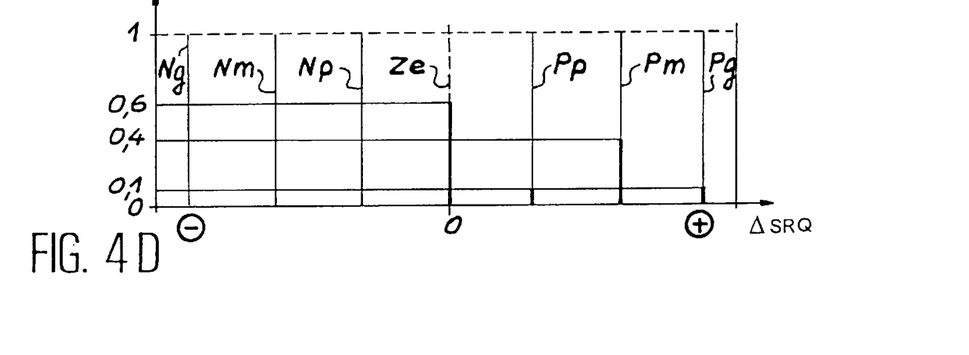

Finally, as shown in FIG. 4D, the membership functions of the corresponding to the output magnitude ΔSRQ are regularly spaced right-hand segments that are parallel to the axis of the ordinates. The length of each segment is a unit. Each segment thus corresponds to a precise speed increase (+direction) or decrease (−direction).

All the parameters corresponding to the table of rules and membership functions are introduced in a once-only operation into the fuzzy logic control card 78.

Assuming that the instantaneous pressure PV on the outlet of injection cylinder 40a or 40b is more or less lower than the maximum permissible pressure PVmax, as is usually the case, fuzzy logic control card 78 establishes the change ΔSRQ to be made to signal flow-rate control signal SRQ using the instantaneous values of input magnitudes ΔPE and ERPE given by signals S1 and S2.

For example, the fuzzy logic control card 78 establishes on the input the degree of compliance of each input magnitude ΔPE and ERPE with the membership functions related to these magnitudes.

More precisely, it is assumed, for example, that the value of the first signal S1, plotted on the axis of the abscissas of the membership functions related to deviation ΔPE, is located in both the isosceles triangles representing membership functions Pm and Pp associated with this magnitude (FIG. 4A). This indicates that the deviation between the pressure setting PEmax and the instantaneous pressure PE measured on the inlet of the mold or molds is positive and that its amplitude is between medium and low. The degree of membership 0.4 and 0.6 of this deviation ΔPE to each of the membership functions Pm and Pp respectively is given by the ordinate of the intersection of the sides of the triangle representing it with the height given by the point representing the first signal.

It is also assumed, again as an example, that the value of the second signal S2, plotted on the axis of the abscissas of the membership functions related to variation rate deviation ERPE of the first signal, is located in both the isosceles triangles representing membership functions Ze and Np associated with this magnitude (FIG. 4B). This indicates that the pressure on the inlet of the mold or molds reduces very slightly. The degree of membership 0.1 and 0.9 of the variation rate ERPE to each of the membership functions Ze and Np respectively is given as for deviation ΔPE.

In the above hypotheses, four of the rules in the table of rules given as an example are involved:

if ΔPE=Pm and ERPE=Ze, then ΔSRQ=Pg (1st rule),
if ΔPE=Pm and ERPE=Np, then ΔSRQ=Pm (2nd rule),
if ΔPE=Pp and ERPE=Ze, then ΔSRQ=Pp (3rd rule),
if ΔPE=Pp and ERPE=Np, then ΔSRQ=Ze (4th rule).

For each of these four rules the fuzzy logic control card 78 compares the degree of compliance of each input magnitude ΔPE and ERPE with the membership functions concerned by the rule in question, and the lowest degree of compliance is selected.

For example, for the first of the above rules, the membership functions concerned are function Pm for the deviation ΔPE and the function Ze for variation rate ERPE.

In the case of signals S1 and S2 whose values are given as examples in FIGS. 3A and 3B, the degrees of compliance corresponding to membership functions Pm and Ze are respectively 0.4 and 0.1. It is therefore this last value of 0.1 that is selected. The same procedure leads to selection for the second, third and fourth rules respectively of degrees of membership of 0.4, 0.1 and 0.6.

The degree of compliance thus selected for each of the rules under consideration is applied to the membership function corresponding to that rule for output magnitude ΔSRQ.

As can be seen from FIG. 4D, this leads to respective allocation for membership functions Pg, Pm, Pp and Ze of the output magnitude ΔSRQ degrees of compliance of 0.1, 0.4, 0.1 and 0.6 for the signals S1 and S2 given as examples in FIGS. 4A and 4B.

On output, the fuzzy logic control card 78 establishes the position of the center of gravity of all the membership functions Pg, Pm, Pp and Ze weighted by the degrees of compliance 0.1, 0.4, 0.1 and 0.6. It then modifies the previous values of the flow-rate control signal SRQ by determining the change ΔSRQ to be made to this value using the abscissa of this center of gravity. In the example under consideration, the signal SRQ is increased by a value slightly superior to that corresponding to membership function Pp.

The same fuzzy logic control card 78, or another card if the capacity of the first card is insufficient, determines, on the basis of a table of rules linking the two input magnitudes ERQE and ΔQE to the output magnitude ΔSRP, the modifications to be made to pressure control signal SRP when the apparatus is operating in controlled pressure mode.

More precisely, the table of rules is identical or comparable with that linking the two input magnitudes ERPE and ΔPE to the output magnitude ΔSRP in controlled flow-rate mode. Similarly, the membership functions allocated to deviation ΔQE, to variation rate ERQE and the change ΔSRP to be made to the pressure control signal are identical or comparable to those allocated to magnitudes ΔPE (FIG. 4A), ERPE (FIG. 4B) and ΔSRQ (FIG. 4D).

The invention is clearly not limited to the embodiment that has been described with reference to the figures. For example, where the apparatus comprises injection cylinders suitable for withstanding all the pressures likely to reached in all the production ranges concerned, measuring the instantaneous pressure on the outlet of the cylinders is not necessary during operation in controlled flow-rate mode.

What is claimed is:

1. Apparatus for manufacturing composite parts by resin transfer molding comprising:
    at least one mold able to accept a fibrous preform;
    means for compressing the preform in the mold;
    at least one resin supply vessel;
    at least one injection cylinder for injecting the resin into the mold;
    control means configured to operate the apparatus in controlled flow-rate mode in which the resin is transferred from the resin supply vessel to the injection cylinder before being injected into the mold by the cylinder at a generally constant rate, and in which the compressing means generally ensure that the fibrous preform is highly compressed, and in a controlled pressure mode wherein the resin is injected directly into the mold by the resin supply vessel at a generally constant rate and wherein the compressing means generally ensure weak compression of the fibrous preform; and
    means of switching the control means between the controlled flow-rate and controlled pressure modes,
    wherein the control means acting on a three-way valve comprise an inlet connected to the resin supply vessel, a first outlet connect to the injection cylinder and a second outlet connected to the mold, the inlet of the three-way valve being connected to the first outlet in controlled flow-rate mode and to the second outlet in controlled pressure mode.

2. Apparatus of claim 1 wherein the control means act upon means for pressurizing the resin supply vessel so that constant pressure is applied to the vessel in controlled flow-rate mode while variable pressure is applied to the vessel in controlled pressure mode.

3. Apparatus of claim 2 wherein several resin supply vessels are connected in parallel in a tank connected to said pressurizing means, each resin supply vessel being connected in turn to the inlet of the three-way valve via a valve commanded by the control means.

4. Apparatus of claim 2 wherein the injection cylinder is controlled by an electric motor fitted with a speed regulator, the control means acting on the speed regulator in controlled flow-rate mode so that the injection cylinder injects a controlled flow of resin into the mold.

5. Apparatus of claim 4 wherein the first pressure sensor is located on the mold inlet and supplies a first instantaneous signal and in which the control means comprise a first comparator means that supplies a first input signal representative of the difference between a maximum pressure setting and first input signal, a second comparator means that supplies a second input signal representative of the difference between two consecutive first input signals, and at least one fuzzy logic control card that, in controlled flow-rate mode, uses the first and second input signals to supply a flow-rate control signal.

6. Apparatus of claim 5 wherein the second pressure sensor is located on the outlet of each injection cylinder and supplies a second instantaneous signal and wherein the control means comprise third comparator means that supply a third input signal representative of the difference between a maximum permissible pressure on the outlet of the injection cylinder and the second instantaneous signal, the flow-rate control signal being set by the fuzzy logic control card, also using the third input signal.

7. Apparatus of claim 5 wherein the control means comprise first limiting means that compare the flow-rate control signal with a reference flow-rate signal to supply a flow-rate control signal to the speed regulator that is equal to the reference flow-rate signal when said signal is less than the flow-rate control signal, and equal to the flow-rate control signal if not.

8. Apparatus of claim 5 wherein the flow-rate measuring means are also located between the second outlet of the three-way valve and the mold and supply a third instantaneous signal, and wherein control means comprising a fourth comparator means supply a fourth input signal flow-rate control signal representative of the difference between a maximum permissible flow-rate and the third instantaneous signal and a fifth comparator means supplying a fifth input signal representative of the difference between two consecutive fourth input signals, the fuzzy logic control card using the fourth and fifth input signals to supply a pressure-regulating signal in controlled pressure mode.

9. Apparatus of claim 8 wherein the control means comprise second limiting means that compare the pressure control signal with a reference pressure signal to supply the pressurizing means with a pressure control signal equal to the reference pressure when the latter is less than the pressure control signal and equal to the pressure control signal if not.

10. Apparatus for manufacturing composite parts by resin transfer molding comprising:

at least one mold able to accept a fibrous preform;

means for compressing the preform in the mold;

at least one resin supply vessel;

at least one injection cylinder for injecting the resin into the mold;

control means configured to operate the apparatus in controlled flow-rate mode in which the resin is transferred from the resin supply vessel to the injection cylinder before being injected into the mold by the cylinder at a generally constant rate, and in which the compressing means generally ensure that the fibrous preform is highly compressed, and in a controlled pressure mode wherein the resin is injected directly into the mold by the resin supply vessel at a generally constant rate and wherein the compressing means generally ensure weak compression of the fibrous preform; and means of switching the control means between the controlled flow-rate and controlled pressure modes, wherein two injection cylinders are mounted in parallel between a second three-way valve comprising an inlet connected to the resin supply vessel and a third three-way valve comprising an outlet connected to the mold, the control means actuating these second and third three-way valves in controlled flow-rate mode so that one of the injection cylinders is connected to the resin supply vessel and isolated from the mold while the other injection cylinder is connected to the mold and isolated from the resin supply vessel, and conversely.

\* \* \* \* \*